(12) United States Patent
Zhang et al.

(10) Patent No.: US 12,010,249 B1
(45) Date of Patent: Jun. 11, 2024

(54) METHOD AND DEVICE FOR ZERO-TRUST FUSION COMPUTATION OF MULTI-PARTY DATA

(71) Applicant: NANHU LABORATORY, Zhejiang (CN)

(72) Inventors: Lei Zhang, Zhejiang (CN); Zhichao Yan, Zhejiang (CN)

(73) Assignee: NANHU LABORATORY, Zhejiang (CN)

( * ) Notice: Subject to any disclaimer, the term of this patent is extended or adjusted under 35 U.S.C. 154(b) by 0 days.

(21) Appl. No.: 18/369,289

(22) Filed: Sep. 18, 2023

(30) Foreign Application Priority Data

Dec. 7, 2022 (CN) .......................... 202211564733.9

(51) Int. Cl.
  *H04L 9/32* (2006.01)
  *H04L 9/08* (2006.01)

(52) U.S. Cl.
  CPC .......... *H04L 9/3263* (2013.01); *H04L 9/0866* (2013.01); *H04L 9/3236* (2013.01)

(58) Field of Classification Search
  CPC .... H04L 9/3263; H04L 9/0866; H04L 9/3236
  See application file for complete search history.

(56) References Cited

U.S. PATENT DOCUMENTS

| | | | | |
|---|---|---|---|---|
| 2017/0163618 A1* | 6/2017 | Peddada | ............... | H04L 9/3236 |
| 2021/0271763 A1* | 9/2021 | Perlman | ............... | G06F 21/602 |
| 2021/0314171 A1* | 10/2021 | Choyi | ................... | H04L 9/3247 |
| 2022/0006620 A1* | 1/2022 | Bursell | ................. | H04L 9/0841 |
| 2022/0114249 A1* | 4/2022 | Grancharov | ............ | G06F 21/53 |

FOREIGN PATENT DOCUMENTS

| | | |
|---|---|---|
| CN | 110034924 A | 7/2019 |
| CN | 114091690 A | 2/2022 |
| CN | 114238510 A | 3/2022 |
| CN | 114707159 A | 7/2022 |
| WO | WO-2021073170 A1 * | 4/2021 |

OTHER PUBLICATIONS

Office Action dated Jan. 18, 2023 issued in CN Patent application 202211564733.9; 7 pages (English translation).

(Continued)

*Primary Examiner* — J. Brant Murphy
(74) *Attorney, Agent, or Firm* — Fresh IP PLC; John R. Bednarz

(57) ABSTRACT

A method and device for zero-trust fusion computation of multi-party data is provided, which adopts a chip-level based trusted execution environment (TEE) technique, and by improving a development preparation phase of a fusion computation background and improving a calculation phase, enable fusion computation of multi-party data to be performed in a zero-trust secure running environment, guaranteeing that the data is in a secure state without trusting any party during an entire process of transmission, storage and fusion computation, and allowing for enhanced data privacy protection. The solution brings many advantages in terms of data storage security, data transmission security and data use security as well as universality and performance superiority.

7 Claims, 4 Drawing Sheets

(56) References Cited

OTHER PUBLICATIONS

Office Action dated Jan. 18, 2023 issued in CN Patent application 202211564733.9; 4 pages (Chinese original).
Notification to Grant Patent Right for Invention dated Feb. 9, 2023 issued in CN Patent application 202211564733.9; 2 pages (Chinese original).
Notification to Grant Patent Right for Invention dated Feb. 9, 2023 issued in CN Patent application 202211564733.9; 1 page (Chinese original).

* cited by examiner

METHOD AND DEVICE FOR ZERO-TRUST FUSION COMPUTATION OF MULTI-PARTY DATA

CROSS REFERENCE TO RELATED APPLICATION

This patent application claims the benefit and priority of Chinese Patent Application No. 202211564733.9 filed with the China National Intellectual Property Administration on Dec. 7, 2022, the disclosure of which is incorporated by reference herein in its entirety as part of the present application.

TECHNICAL FIELD

The present disclosure belongs to the technical field of data security, and in particular, relates to a method and device for zero-trust fusion computation of multi-party data.

BACKGROUND

At present, when fusion computation of data is carried out across different industries, different fields and different departments, there are still many potential safety hazards in data transmission, storage, use, etc.

Firstly, with regard to transmission, a plaintext transmission mode is currently used in most cases, and in a relatively sensitive field, a transport layer security (TLS) encrypted transmission form is adopted at most to guarantee the security. The plaintext transmission mode has no guarantee of security and can rely only on network border protection. While ordinary TLS encrypted transmission is incapable of reliably protecting a private key file for guaranteeing the transmission security, thus when a server host is breached or a malicious operation is performed by the operation and maintenance staff, the private key file is extremely prone to leakage to crack the security of the transmission state.

Secondly, with regard to storage, most data is currently stored in a general database. In a cross-domain data sharing process, shared data may be distributed to various kinds of databases which are of varying quality. Usually, it is hard to guarantee that all databases have high-grade safety guarantee, and for a majority of data, even the account and password with the highest administrator privileges can be found on a host. Therefore, a sensitive database may easily cause leakage in cross-domain storage.

Finally, with regard to usage, when data is loaded into a memory by an application program for analytical calculation, the data is substantially in an unprotected plaintext state in the industry at present. In other words, once data is loaded into the memory, the data can be directly read by copying the memory. Furthermore, a more advanced attack means may directly alter a program code in the memory such that the program changes the original run logic to directly output and unload sensitive information.

The above-mentioned risks have become difficulty and pain point in connecting various nodes for smooth data operation in case of different industries, different fields, different departments and different needs in multi-scenario applications. Especially, in some application fields requiring fusion computation of sensitive privacy data, fusion cannot be performed, or legal and compliant fusion cannot be performed.

To solve the above technical problems, some solutions have been proposed currently, mainly including a security multi-party computation technique based on cryptography, a federated learning technique based on cryptography, a distributed data analysis technique based on a blockchain smart contract, etc. These techniques have certain technical defects in terms of performance, universality, security and the like in practical application.

For example. Chinese patent (CN114707159A) discloses a multi-party data conjoint analysis system and method, a device and a medium, in which a security multi-party data conjoint analysis system and method implemented using a homomorphic encryption cryptographic solution are proposed. Homomorphic encryption currently has prevalent performance problems such as low operating efficiency, huge keys and cyphertext explosion.

For example, Chinese patent (CN114091690A) discloses a training method and a calling method for a federated learning model and a federated learning system, in which a method for training a model with multi-party data security by using the federated learning technique is Proposed. While the method is capable of protecting the security of multi-party data, the application scenario thereof is limited to an artificial intelligence model training scenario.

For example, Chinese patent (CN114238510A) discloses a multi-party data comparison method based on a blockchain, an electronic device and a storage medium, in which a method of performing data fusion and comparison based on a blockchain smart contract technique is proposed. On one hand, when data is encrypted and decrypted by the method, it is still difficult to guarantee the security of keys themselves and decrypted data in the computer memory: and on the other hand, due to poor universality of data fusion computation thereof, different algorithms need to be customized for different data fusion computation scenarios.

SUMMARY

In view of the above-mentioned problems, an objective of the present disclosure is to provide a method for fusion computation of multi-party data in a zero-trust secure running environment, guaranteeing that the data is in a secure state without trusting any party during an entire process of transmission, storage and fusion computation, and a method and device for zero-trust fusion computation of multi-party data allowing for enhanced data privacy protection.

To achieve the above-mentioned objective, the present disclosure adopts the following technical solutions.

1. A method for zero-trust fusion computation of multi-party data, including:
   S1. upon receiving a fusion computation request, starting up a fusion computation background in a trusted execution environment (TEE) and loading the fusion computation background into an encrypted memory;
   S2. verifying, in the TEE, a unique metric value hash1 of the fusion computation background: if the unique metric value hash1 is consistent with a unique metric value hash1 obtained by measuring the fusion computation background and stored at a deployment stage, starting running a program and acquiring a key key 1 derived by the TEE and uniquely bound to the fusion computation background: otherwise, reporting an error and quitting;
   S3. determining whether the fusion computation background has a self-signed certificate; if the fusion computation background does not have a self-signed certificate, generating a self-signed certificate including a root certificate CA1, a back-end server certificate and a back-end server private key using a self-signed certificate generating tool of the fusion computation background, and encrypting and saving the back-end server private key using the key key 1;

if the fusion computation background has a self-signed certificate, decrypting and loading the encrypted and saved back-end server private key based on the key1; if decryption is successful, continuing to run the program; otherwise, determining that loading fails;

S4, enabling, by the fusion computation background, an Https interface service based on the self-signed certificate for a front-end web service to call: and S5, when a start running interface is called, decrypting, by the fusion computation background, corresponding database configuration information in the TEE and loading the database configuration information into the encrypted memory, establishing a secure link with all parties' databases based on the database configuration information, and pulling corresponding data into the encrypted memory for fusion computation according to a data fusion computation logic of the fusion computation background: and returning a result to one or more parties requesting a fusion result after completion of the calculation;

the method further including the following step before step S5:

receiving. by the fusion computation background, in the TEE, the database configuration information, and encrypting and saving the database configuration information by the key key1 of the TEE.

In the above method for zero-trust fusion computation of multi-party data, wherein the fusion computation background is embedded with the self-signed certificate generating tool at a development stage;

at a deployment stage of the fusion computation background, the fusion computation background is measured by a program integrity verifying tool to obtain the unique metric value hash1: and in step S2, the loaded fusion computation background software is re-measured by a same program integrity verifying tool in the TEE to obtain the unique metric value hash1.

In the above method for zero-trust fusion computation of multi-party data, at a deployment stage of a software of the fusion computation background, before startup of the fusion computation background, measuring the fusion computation background by the program integrity verifying tool to obtain the unique metric value hash 1 and save the metric value hash 1;

when the fusion computation background is started up for the first time, measuring, by using the same program integrity verifying tool in the TEE, the loaded fusion computation background to obtain the unique metric value hash1, and comparing the unique metric value hash1 with the saved hash1, if the unique metric value hash1 and the saved hash 1 are consistent, starting to run the program, and deriving the unique corresponding key key1 for the unique metric value hash1 based on the unique metric value hash1; and in step S2, when it is verified in TEE that the unique metric value hash1 of the fusion computation background is consistent with the unique metric value hash1 thereof saved at the deployment stage, the program is started to run, and the correct key key1 is obtained.

In the above method for zero-trust fusion computation of multi-party data, the root certificate CA1 of the fusion computation background is configured in a program of a front-end web service; and in step S4, the self-signed certificate of the fusion computation background is verified by using the root certificate CA1: if verification is successful, an Https connection between the front-end web service program and the fusion computation background is established: otherwise, if the verification fails, connection fails.

In the above method for zero-trust fusion computation of multi-party data, the front-end web service is embedded with the self-signed certificate generating tool at the development stage; the method further including before step S5:

A, starting up the front-end web service in the TEE; loading the front-end web service into the encrypted memory: verifying, in the TEE, a unique metric value hash2 of the front-end web service, if the unique metric value hash2 is consistent with a unique metric value hash2 obtained by measuring the front-end web service and saved at the deployment stage, starting running and acquiring a key key2 derived by the TEE and uniquely bound to the front-end web service: otherwise, reporting an error and quitting; and B. after the front-end web service is started up, determining whether the front-end web service has a self-signed certificate: if the front-end web service does not have a self-signed certificate, generating a self-signed certificate including a root certificate CA2, a front-end server certificate and a front-end server private key using the self-signed certificate generating tool of the front-end web service, and encrypting and saving the front-end server private key using the key2: and if the front-end web service has a self-signed certificate, decrypting and loading the encrypted and saved front-end server private key based on the key2: if decryption is successful, continuing to run the program: otherwise, determining that loading fails.

In the above method for zero-trust fusion computation of multi-party data, at a deployment stage of a software of the program of the front-end web service, before startup of the front-end web service, measuring the front-end web service and the root certificate CA1 by the program integrity verifying tool to generate the unique metric value hash2 for identifying the software of the front-end web service, and save the unique metric value hash2:

when the front-end web service is started up for the first time, measuring the loaded front-end web service, by using the same integrity verifying tool, in the TEE, to obtain the unique metric value hash2, and comparing the unique metric value hash2 with the saved hash2; if the unique metric value hash2 and the saved hash2 are consistent, starting to run the program, and deriving the unique corresponding key key2 for the unique metric value hash2 based on the unique metric value hash2: and wherein during process A, when the TEE verifies that the unique metric value hash2 of the front-end web service is consistent with the unique metric value hash2 thereof saved at the deployment stage, the program is started to run, and the correct key key2 is obtained.

In the above method for zero-trust fusion computation of multi-party data, a browser used by a user is installed with the root certificate CA2: when each party of data accesses the front-end web service through the browser, a transport layer security (TLS) certificate of an access link is verified by using the root certificate CA2, and a feedback is provided according to a verification result. If verification is successful, security access is allowed, and if verification is not successful, a security prompt is provided, and access is not suggested.

A device for zero-trust fusion computation of multi-party data, configured to perform the above method for zero-trust fusion computation of multi-party data and including a front-end web service module, a general business module and a privacy calculation framework module, wherein the privacy calculation framework module is configured to shield a hardware difference, provide a basic platform for a business application to run, and provide chip-level file encryption and decryption, program integrity verification and trusted environment running resource management;

the general business module is configured to provide a business service in sharing big data, including any one or more of a privacy database configuration service, an ordinary database configuration service, a user authority management service and a business result query and export service;

the front-end web service module includes a self-signed certificate generating tool, a security reinforced web service and a front-end interface program, the self-signed certificate generating tool is configured to generate a certificate and a private key required for hosting an Https transport protocol in a TEE, and encrypt and store the certificate and the private key in an encryption and decryption file system;

the security reinforced web server is configured that when being used, a program thereof and a configuration file thereof are both signed and verified, and runs in the TEE;

the front-end interface program is configured to be signed and verified when being used, and run in the TEE;

the privacy calculation framework module includes a platform adaptation middleware, a TEE operating system and an encryption and decryption file system, wherein the platform adaptation middleware is configured for docking with different central processing unit (CPU) drivers and to provide a uniform functional interface to an upper layer to shield a programming difference caused by the different CPU drivers;

the TEE operating system includes a LibC library, a program integrity verifying tool and a TEE running resource management tool, wherein the program integrity verifying tool is configured to measure a file required for running a program to obtain a corresponding metric value hash; and the encryption and decryption file system is configured to provide a transparent file encryption and decryption function based on software unique binding.

The present disclosure has the following advantages:

The present disclosure has the advantages in terms of security, universality and performance superiority.

Regarding the security advantage, the present disclosure can guarantee data storage security, data transmission security and data use security. A zero-trust state may be formed at a calculation node for data. That is, there is no need to trust any administrator or privileged user of the calculation node. The calculation node for data may be placed on any of parties distrusting each other or on a third party.

Regarding data storage security, an encryption key which is readable and visible only by the CPU and bound to the unique metric value of a program is generated in the TEE, and sensitive data is encrypted by using the key and then stored on a server disk. Since the key is generated in an isolated state and bound to the program, the key can be read only by the specified program, and any person (including a person having the highest system authority) cannot acquire the plaintext key.

Regarding the data transmission security, the present disclosure uses chip-level TLS encrypted transmission of an elliptic curve Diffie-Hellman key exchange (ECDHE) self-signed certificate based on an elliptic curve algorithm, and meanwhile enhances the security by using the TEE. A private key file guaranteeing TSL secure transmission is generated and encrypted in the TEE, thereby guaranteeing that the private key cannot be known and stolen by any person and effectively preventing data from being monitored and tampered and from a man-in-the-middle attack during transmission.

Regarding data use security, in the TEE, the memory for the program to run is encrypted by hardware. The present disclosure places the process of data use and calculation also in the TEE, which ensures that when the program runs, the data is still present in the encrypted state when loaded into the memory for calculation, thus guaranteeing that loaded sensitive data cannot be leaked by stealing the memory. The integrity of the program can also be guaranteed and the program run logic cannot be altered by modifying the memory, thus avoiding secret data from being stolen.

Regarding the advantage of universality, the present disclosure has general business module support and can guarantee the security of data with no need to carry out special transformation and algorithm modification for the related business logic of data fusion computation.

Regarding the advantage on performance, the method and device provided in the present disclosure can run the data fusion computation background on a general server with no extra algorithm loss, and have significant performance advantage.

DETAILED DESCRIPTION OF THE EMBODIMENTS

The present disclosure will be further described in detail below with reference to the accompanying drawings and specific implementations. The present disclosure provides a method for zero-trust fusion computation of multi-party data. The method uses the chip-level based Trusted Execution Environment (TEE) technique, which constructs a trusted secure environment by means of trusted, tamper-resistant software and hardware. In hardware, an encrypted memory is directly assigned for sensitive data by a chip instruction set, and all sensitive data is computed in the encrypted memory. The data is processed by a trusted program in the environment, whereby the program code or the data may be protected from being stolen or tampered by an operating system or other application programs. Different from an ordinary computation environment, an attack interface of a trusted computation environment becomes very small, and it can be guaranteed that the data cannot be leaked and stolen even in the event that the operating system, a network or a kernel layer is breached.

Figure 1:
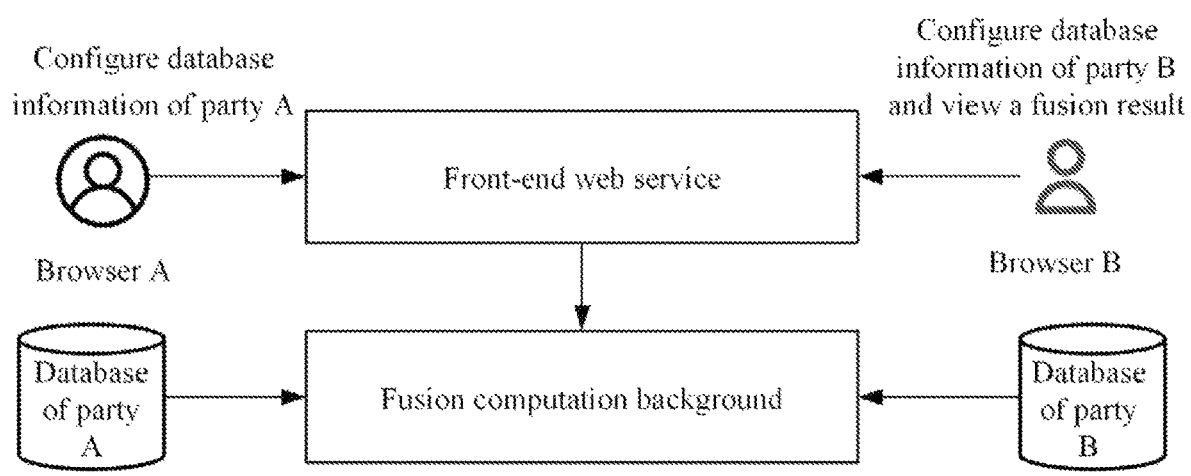
FIG. 1 is a diagram illustrating whole steps of a method for zero-trust fusion computation of multi-party data according to the present disclosure.

The overall steps of the method are as shown in FIG. 1. A scenario of two-party data fusion is illustrated in FIG. 1. In practice, the fusion may be expanded to any multiple parties. Specific steps are as follows.

1) Party A is a pure provider of data, which only shares data. Party A inputs through a front-end interface (a web page) database configuration information of party A, including necessary information for connecting to a database to acquire data, such as a database address, an account name, a password, a TLS certificate and a database name.

2) After receiving the information, a front-end web service transmits the database configuration information to a fusion computation background through an Https protocol, and encrypts and stores the database configuration information.

3) Party B is a data provider and a fusion computation result acquiring party. Party B enters a front-end interface through a different account from party A and inputs database configuration information of party B, which also includes necessary information for connecting to a database to acquire data, such as a database address, an account name, a password, a TLS certificate and a database name.

4) After receiving the information, the front-end web service also transmits the database configuration information to the fusion computation background through the Https protocol, and encrypts and stores the database configuration information.

5) Party B clicks on a data fusion computation start button on the interface.

6) The fusion computation background starts running a fusion computation logic negotiated by the two parties, pulls necessary data from the database of party A and the database of party B. and carries out fusion computation.

7) After completion of the calculation, the fusion computation background returns a calculation result to the front-end interface of party B through the https protocol for viewing and downloading by party B.

To guarantee the security of the data during fusion computation, the present disclosure provides a method which is designed by using the TEE such that the front-end web service and the fusion computation background are both in a zero-trust state.

The so-called zero-trust state refers to that when subjected to fusion computation, data is in the encrypted state during transmission, storage and running, and an encryption key cannot be known and acquired by any human entity and can only be decrypted and acquired by a software program approved by both data providers. And, the software program itself cannot be tampered. In this state, even though a malicious person has the highest authority for a server running software program or the server is breached on the software level, the security of fusion computation can still be guaranteed.

Figure 2:
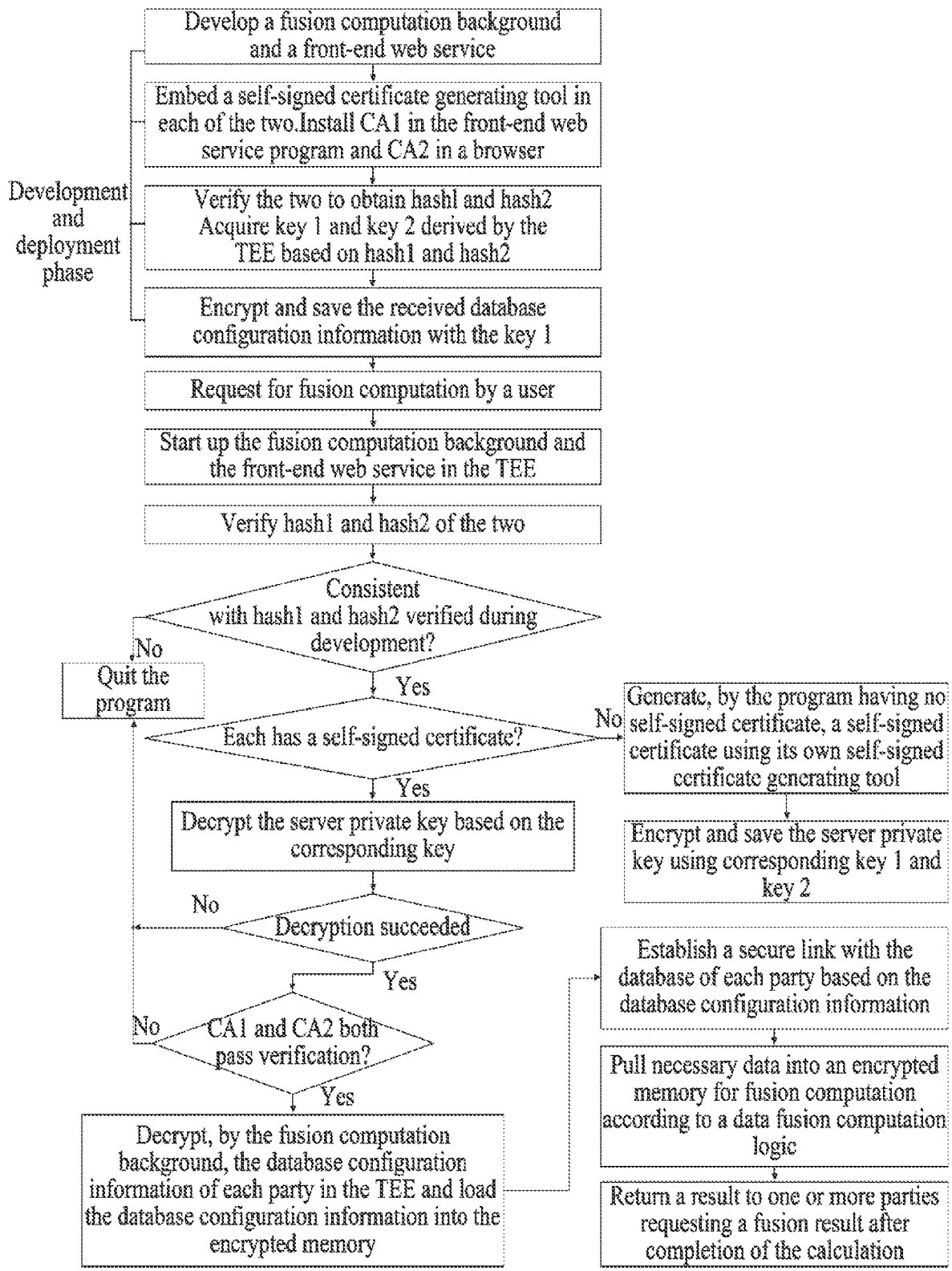
FIG. 2 is a flowchart of a zero-trust fusion process of multi-party data in a method for zero-trust fusion computation of multi-party data according to the present disclosure.

As shown in FIG. 2, a development preparation stage and a calculation stage that enable the front-end web service and the fusion computation background to be in the zero-trust state are described below.

The development preparation stage is described below.

Each party of data develops a fusion computation background software program according to a fusion computation logic actually required, and develops a front-end web service program according to an actual requirement for fusion computation interface.

It should be known that it is the fusion computation background and the front-end web service acknowledged by each party of data that are developed here. The actual development work for the fusion computation background and the front-end web service is not necessarily performed by all the parties of data, and may be entrusted to one or more parties, even to a third party that does not participate in data fusion.

During development, a self-signed certificate generating tool is embedded in the fusion computation background. The self-signed certificate generating tool is configured to generate a self-signed certificate of the fusion computation background, and the self-signed certificate includes a root certificate CA1, a back-end server certificate and a back-end server private key.

At a deployment stage for the fusion computation background software, the software program is verified and measured by using a verifying tool of the TEE, and a key is derived therefor by using an encryption and decryption file system. Specifically, for the fusion computation background at the deployment stage, firstly the software is measured by using a program integrity verifying tool outside the TEE before the program starts running, to obtain a unique metric value hash1 and save the value, and then first startup is carried out, and at this time, the loaded fusion computation background is measured again by using a program integrity verifying tool having a same metric logic in the TEE to obtain a unique metric value hash1. The hash1 is compared with the hash1 saved before startup, and if the two are consistent, the fusion computation background program is run, and a unique corresponding key key1 is derived therefor by the encryption and decryption file system of the TEE based on the unique metric value hash1. The key key1 is bound to the hash1, and subsequently, the key key1 can only be acquired when the same fusion computation background runs.

The root certificate CA1 of a back-end service is configured in the front-end web service program. Likewise, at the development stage, the front-end web service program is embedded with the self-signed certificate generating tool. The self-signed certificate generating tool is configured to generate a self-signed certificate of the front-end web service, and the self-signed certificate includes a root certificate CA2, a front-end server certificate and a front-end server private key.

At the deployment stage, the front-end web service program and the root certificate CA1 are measured by using the verifying tool of the TEE, and a key is derived therefor by using the encryption and decryption file system. Specifically, for the front-end web service at the deployment stage, firstly the software is measured by using the integrity verifying tool before the program starts running, to obtain a unique metric value hash2 and save the value, and then first startup is carried out, and at this time, the loaded front-end web service is measured by using the same program verifying tool in the TEE to obtain a unique metric value hash2. The hash2 is compared with the hash2 measured and saved before startup, and if the two are consistent, the front-end web service program is run, and a unique corresponding key key2 is derived therefor by the encryption and decryption file system based on the unique metric value hash2. The key key 2 is bound to the hash2, and subsequently, the key key2 can only be acquired when the same front-end web service runs.

Moreover, the root certificate CA2 is installed in a browser used by a user.

The fusion computation background running in the TEE provides an Https interface service based on the self-signed certificate for the front-end web service to invoke, including a database configuration information interface, a start running interface, etc. Each party manipulates the interface in the browser, fills in the database configuration information and clicks submit to trigger the front-end web service to invoke these interfaces. Upon receiving the database configuration information in the TEE, the fusion computation background encrypts and saves the database configuration information using the key key1 directly derived from the chip layer in the TEE for use by subsequent fusion computation.

The calculation stage is described below.

1, The user requests for fusion computation through the browser.

The front-end web service is started up in the TEE. The front-end web service program is loaded into the encrypted memory. After the front-end web service program is loaded by the TEE, the unique metric value hash2 thereof is verified. When the unique metric value hash2 is consistent with the hash2 saved at the deployment stage, the front-end web service is successfully run in the encrypted memory and may acquire the key key2. Otherwise, the system reports an error and quits.

The fusion computation background is started up in the TEE. The fusion computation background program is loaded into the encrypted memory. After the fusion computation background software program is loaded by the TEE, the unique metric value hash1 thereof is verified. When the unique metric value hash1 is consistent with the hash1 saved at the deployment stage, the fusion computation background is successfully run in the encrypted memory and may acquire the key 1. Otherwise, the system reports an error and quits.

The above-mentioned encrypted memory is provided by the own capability of the TEE, and a key used by the encrypted memory is known only by the chip.

2, After the fusion computation background program runs, it is firstly determined whether the self-signed certificate is already present. If not, the self-signed certificate (including the root certificate CA1, the back-end server certificate and the back-end server private key) is generated by using the self-signed certificate generating tool, and the back-end server private key is encrypted and saved by using the key key1 acquired in the TEE. The key 1 is directly derived from the chip layer in the TEE and bound to the unique metric value hash1, i.e., can only be acquired by this program for encryption and decryption.

If the certificate is already present, the corresponding key key1 is acquired by using the hash1 obtained by measurement at this time, and the back-end server private key is decrypted by using the key1. Only by ensuring that the fusion computation background run at this time is not modified, the same hash1 may be obtained, and thereby the correct key1 may be acquired, to successfully decrypt the server private key. Once the fusion computation background is altered, the encrypted back-end server private key cannot be decrypted, and the self-signed certificate cannot be loaded correctly.

Likewise, after the front-end web service program runs, it is firstly determined whether the self-signed certificate is already present. If not, the self-signed certificate (including the root certificate CA2, the front-end server certificate and the front-end server private key) is generated by using the self-signed certificate generating tool of the front-end web service program, and the front-end server private key is encrypted and saved by using the key key2 acquired in the TEE. The key key2 is directly derived from the chip layer in the TEE and also bound to the unique metric value hash2. That is, the key key2 can only be acquired by this program for encryption and decryption.

If the self-signed certificate is already present, the corresponding key key2 is acquired by using the hash2 obtained by measurement at this time, and the front-end server private key is decrypted by using the key2. Only by ensuring that the front-end web service run at this time is not modified, the same hash2 may be obtained, and thereby the correct key2 may be acquired. Once the front-end service is altered, the encrypted front-end server private key cannot be decrypted, and the self-signed certificate cannot be loaded correctly.

The generation of the self-signed certificate is for the purpose of establishing a secure transmission channel. The transmission protocol https used in the present disclosure is established based on the internal self-signed certificate in the present disclosure. Since the private keys of the front-end server certificate and the back-end server certificate are encrypted and cannot be leaked, zero trust in transmission can be guaranteed.

3, after the certificate is generated, the fusion computation background enables the Https interface service based on the self-signed certificate for the front-end web service to invoke, mainly including database configuration information interface service and start running interface service, etc.

The self-signed certificate of the fusion computation background is verified by using the measured CA1. If verification is successful, an Https connection between the front-end web service program and the fusion computation background is established; otherwise, if the verification is failed, the connection is failed. Thus, the transmission security between the front-end web service program and the fusion computation background is guaranteed.

Moreover, a TLS certificate of an access link is verified by using the certificate CA2. If the verification is successful, secure access is allowed. If the verification is failed, a security prompt is provided and access is not suggested, to guarantee transmission security between the browser and the front-end web service.

4, When the start running interface is invoked, the program decrypts the corresponding database configuration information using the key1 in the TEE and loads the database configuration information into the encrypted memory, establishes a secure link with the corresponding database by using the database configuration information, and pulls necessary data into the encrypted memory according to a data fusion computation logic for fusion computation, and returns a result upon completion of calculation.

Figure 3:
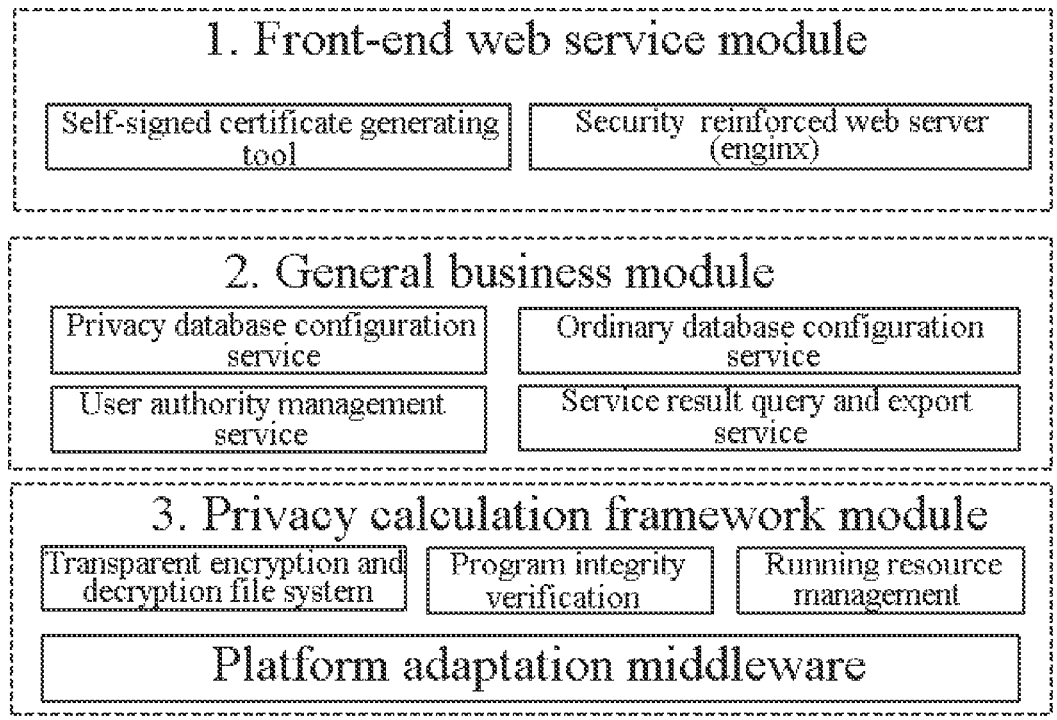
FIG. 3 is a structural block diagram of a device for zero-trust fusion computation of multi-party data according to the present disclosure.

As shown in FIG. 3, the present disclosure further provides a device for zero-trust fusion computation of multi-party data. The device includes a front-end web service module, a general business module and a privacy calculation framework module.

The privacy calculation framework module mainly includes platform adaptation middleware, an encryption and decryption file system, a program integrity verifying component and a running resource management component. The privacy calculation framework module is mainly configured to shield a hardware difference and provide a basic platform for a business application to run, allowing the business application to seamlessly run in the Trusted Execution Environment without modifying the source code and without recompilation. The privacy calculation framework module further provides functions such as chip-level file encryption and decryption, program integrity verification and trusted environment running resource management and provides more perfect security and usage guarantee for the business application.

The general business module is mainly provided for use by back-end services, mainly including a privacy database configuration service, an ordinary database configuration service, a user authority management service and a business result query and export service. With these services, general functions such as data source configuration, user login authentication and secure result export required by businesses do not need to be developed repeatedly.

The front-end web service module mainly includes two major components: a mainstream web server nginx and a self-signed certificate generating tool. It needs to be noted that the nginx provided in the module also runs in the Trusted Execution Environment to guarantee that the private key of the self-signed certificate cannot be stolen and leaked on the one hand, and on the other hand to guarantee the integrity of the front-end web service program, preventing the front-end web service from being breached and modified.

Since a special CPU instruction set needs to be invoked to use the Trusted Execution Environment (TEE) provided by the CPU, and traditionally, the developer has to use specific software development kit (SDK) to develop applications to enable the applications to be run in the TEE. The traditional way has the following significant problems: 1, limitation of a developing and programming language: generally, the provided SDK supports a specific language, which usually supports only the traditional C/C++ language. This means that the developer can only use the language supported by the SDK in development and cannot use more friendly and efficient programming languages such as currently mainstream Java, Python and Go. 2, function limitation: the trusted TEE cannot directly access resources of untrusted HostOS, and the SDK usually can only provide a basic software library and tool set. The developer cannot use existing modules, and the development efficiency is greatly reduced, resulting in a failure to obtain medium to large-scale software applications. 3, poor software compatibility: compatibility with the developed software is impossible, and running in the TEE can be realized only after modification, and complex upper-layer applications and high-throughput data cannot be supported.

To guarantee rapid iterative development of a new business application and seamless migration of existing applications in the industry to the Trusted Execution Environment, the device is firstly designed with the privacy calculation framework module to shield a hardware difference and provide a basic platform for a business application to run, allowing the business application to seamlessly run in the Trusted Execution Environment without modifying the source code and without recompilation. Functions such as chip-level file encryption and decryption, program integrity verification and trusted environment running resource management, etc. are provided, to provide more perfect security and usage guarantee for the business application.

Figure 4:
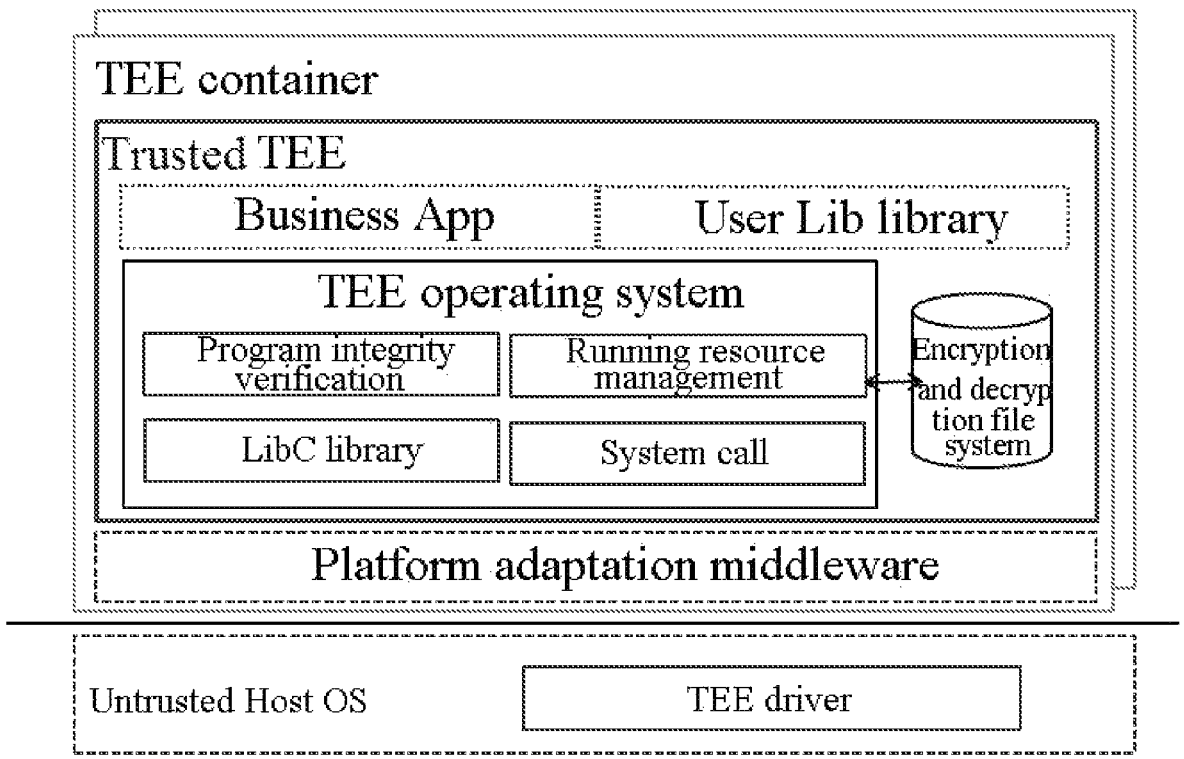
FIG. 4 is a framework structure diagram of a privacy computation framework module in a device for zero-trust fusion computation of multi-party data according to the present disclosure.

As shown in FIG. 4, a privacy calculation framework is composed of three major parts; platform adaptation middleware, a TEE operating system and an encryption and decryption file system.

The platform adaptation middleware is mainly configured for docking with different CPU drivers and to provide a uniform functional interface to an upper layer to shield a programming difference caused by the different CPU drivers.

The TEE operating system is a core part of the framework, which docks with the platform adaptation middleware downwards to acquire the hardware resources of the TEE, and provides upwards a function similar to an ordinary operating system to provide a software environment for application programs to run. The TEE operating system mainly includes a LibC library, a system call, a program integrity verifying tool and a TEE running resource management tool.

The LibC library and the system call lay a foundation for enabling a business application to be seamlessly migrated for development. Application development does not have to be limited to SDK and may be done by using an advanced language like ordinary development.

The program integrity verifying tool is configured to measure the integrity of the program. An important guarantee for the running security of an application program is to guarantee the integrity of the program in the running state, ensuring that the program is not maliciously tampered during running. The verifying tool is configured to measure all files required by program running at the application deployment stage, mainly measuring the files required by the front-end web service program and the fusion computation background program during running, including software itself, a dynamic loadable library, a configuration file, a data file needing to be loaded, etc. For example, the front-end web service is measured to obtain a unique metric value hash2, and the fusion computation background is measured to obtain a unique metric value hash1. When the program is loaded and run in the TEE, this tool re-measures, and the program can truly start and run when the results are consistent. Since the program now is in the TEE, and is loaded into the memory which is in a state of being protected by encryption and thus can be hardly tampered maliciously, thereby guaranteeing the integrity of the application program. The TEE running resource management tool is mainly configured to configure and manage the memory for the program to run in the TEE and a usage limit of the CPU and the like.

The encryption and decryption file system provides a transparent file encryption and decryption function, allowing an application program to normally read a written file like reading a plaintext file, and the written file is actually in the encrypted state when being stored on a host disk. The encryption and decryption file system is a component for guaranteeing that encrypted sensitive information can be read and used by the application program but cannot be viewed as plaintext by an ordinary program or person. The file system provides an encryption function based on software unique binding. In the present disclosure, this function is specifically performed as follows: a key key2 is derived based on the unique metric value hash2 obtained by measuring the front-end web service, and a key key 1 is derived based on the unique metric value hash1 obtained by measuring the fusion computation background. Thus, an effect of key-to-software binding is achieved.

The encryption way with software unique binding may realize that an encrypted file can only be decrypted and read by specified software. Any modification to the software and even to a configuration will result in that the file cannot be decrypted, and it needs to be particularly noted that the keys are directly derived by a chip and cannot be stolen by any person. By this way, data can be effectively bound to the software, and a malicious person cannot read the encrypted data by tampering the run logic of the program to output and leak information.

Figure 5:
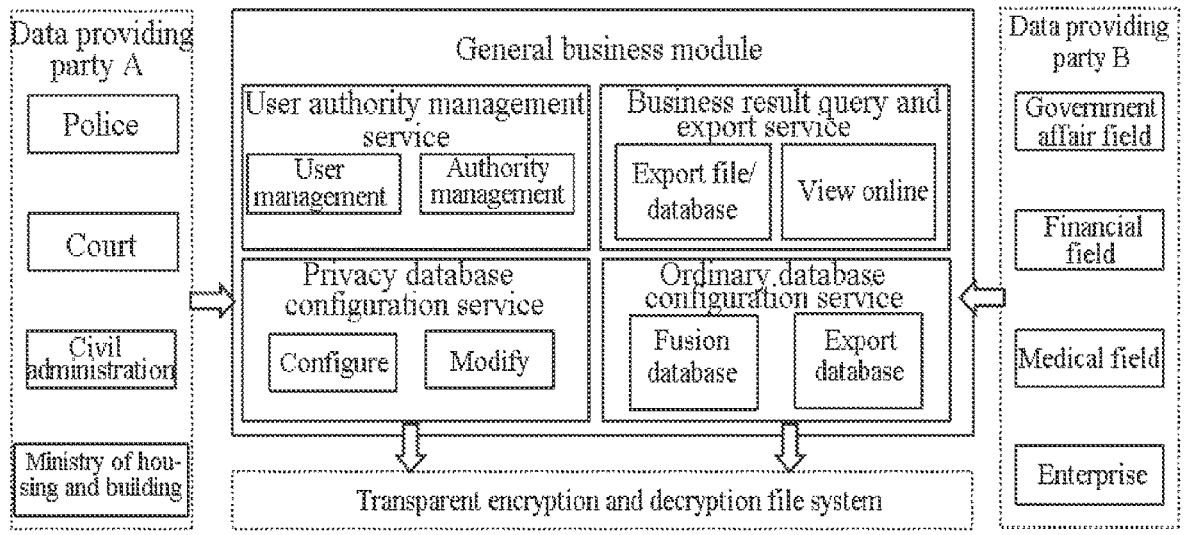
FIG. 5 is a framework structure diagram of a general business module in a device for zero-trust fusion computation of multi-party data according to the present disclosure.

As shown in FIG. 5, the general business module provides some common business services in various big data shared use scenarios, including the privacy database configuration service, the ordinary database configuration service, the user authority management service and the business result query and export service.

The privacy database configuration service provides an interface for configuring and modifying the account information of a privacy database needing to be protected. A data provider logs in the system platform to fill in the database configuration information. The back-end service, namely the fusion computation background, receives the database configuration information, and then encrypts the information using the key key1 and stores the information in the encryption and decryption file system. The fusion computation background program is embedded with the general module of privacy database configuration service and thus has the interface for configuring the account information of the database. A system currently uses the software binding manner for encryption. That is, the stored sensitive account information can only be decrypted by the software of the system and cannot be attacked and stolen by any person or virus software, and the security of the account information is guaranteed.

The ordinary database configuration service provides an interface for configuring the account information of a fusion database and a result export database. A data user logs in the system platform to configure a data source that needs fusion computation with sensitive data and export the account information of a database. It is stored in the file system also in the form of software bound encryption.

The user management service provides a series of interfaces for user management and authority management, including functions such as user creation and deletion, authority role control and modification, and login control, etc.

The business result query and export service is configured for functions such as exporting a fusion computation result of business data into a file, importing the file to a target database configured by the user, and previewing online.

The general business module enables encrypted configurations related to data services, i.e., related configurations (such as an address, a name, a user name and a password) can be "used" by the data user based on an application, but cannot be "viewed and stolen" directly by the data user.

Figure 6:
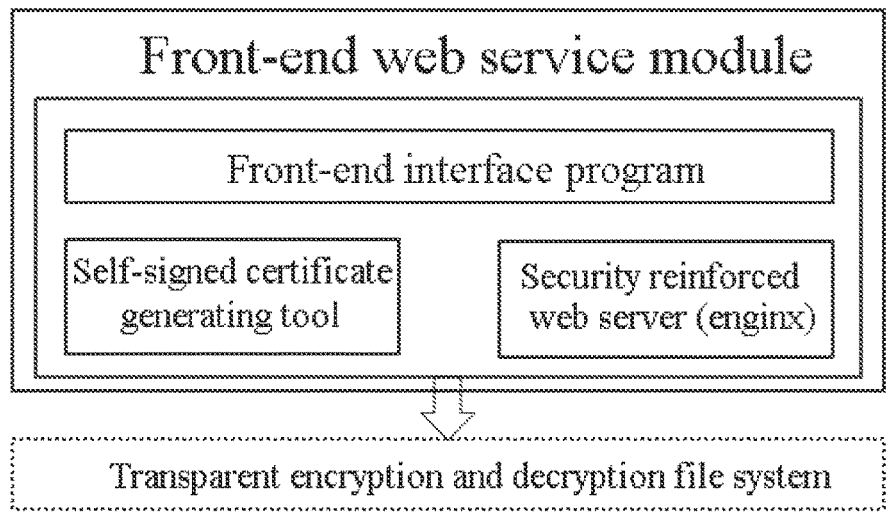
FIG. 6 is a framework structure diagram of a front-end web service module in a device for zero-trust fusion computation of multi-party data according to the present disclosure.

As shown in FIG. 6, the front-end web service module provides a user login system, an interface for configuring sensitive account information, the security guarantee for which is especially important. Therefore, the present device performs security reinforcement for a web server and also runs the web server in the TEE, guaranteeing the all-round security of the system.

As shown in FIG. 6, the front-end web service module, namely the front-end web service in the process of the method, mainly includes three parts: a self-signed certificate generating tool, a security reinforced web service and a front-end interface program.

The self-signed certificate generating tool is configured to generate in the TEE a self-signed certificate required for carrying an Https transport protocol, including a root certificate CA2, a front-end server certificate and a front-end server private key that are encrypted by using a key2 and stored in the encryption and decryption file system. Guaranteeing that the private key is not stolen during secure Https transmission is a basis for guaranteeing the transmission security. Compared with that the operation and maintenance staff traditionally stores a private key directly on a server, the private key of the present system is automatically generated by a program and then automatically stored in the encryption file system. Thus, it is guaranteed that the plaintext information of the private key cannot be acquired by any person and malicious software, effectively preventing data from being monitored and tampered and from a man-in-the-middle attack during transmission and ensuring the security of https transmission.

A security reinforced web server has no difference in use from an ordinary nginx proxy server. However, the program and the configuration file of the security reinforced web server are measured and verified by the system, and the security reinforced web server is run in the TEE. Thus, it is guaranteed that the configuration file of the web service cannot be modified maliciously, and the following traditional case can be avoided: malicious software or person saves information input by a user on a front-end page by modifying the configurations (such as a certificate path and a back-end service path) of the web server after the host is breached, leading to information leakage.

The front-end interface program is also measured and verified, and run in the TEE. Usually, the front-end web service is open-sourced, and the run logic thereof may be easily modified maliciously, leading to information leakage. After verification is added for the present device, once the source code of a program is modified by malicious software, the change of the program may be automatically detected when the program is reloaded, and thus, the program is directly closed, preventing a user from further inputting sensitive information on the front-end page in the presence of a security risk.

In the present disclosure, the following methods are provided: a method in which the front-end web server and the back-end fusion computation service are run in the TEE to guarantee that the memory is in the encrypted state when the front-end and back-end programs are run, guaranteeing that data is in the zero-trust state in use, a method in which the program file and the configuration file required for the fusion computation service to run are measured and verified during running, guaranteeing that the program cannot be tampered, a method in which a self-signed certificate tool is embedded in a program such that a certificate is generated in the TEE, and the certificate is encrypted and saved by using a chip derived key bound to a software metric value to guarantee that data is in the zero-trust state during transmission, a method in which sensitive information such as a database account is encrypted and saved by using a chip derived key bound to a software metric value to guarantee that data is in the zero-trust state during storage. The front-end web service module can be run under zero trust. The privacy calculation framework module is capable of seamlessly migrating an application to the TEE.

The specific embodiments described herein are merely intended to illustrate the spirit of the present disclosure by way of example. A person skilled in the art can make various modifications or supplements to the specific embodiments described or replace them in a similar manner without departing from the spirit of the present disclosure or the scope defined by the appended claims.

What is claimed is:

1. A method for zero-trust fusion computation of multi-party data, comprising:

upon receiving a fusion computation request, starting up a fusion computation background in a trusted execution environment (TEE) and loading the fusion computation background into an encrypted memory;

verifying, in the TEE, a unique metric value hash1 of the fusion computation background in response to the unique metric value hash1 being consistent with a unique metric value hash1 obtained by verification and measurement of the fusion computation background and storage thereof at a deployment stage, starting running a program and acquiring a key key1 derived by the TEE and uniquely bound to the fusion computation background, and in response to the unique metric value hash1 being inconsistent with a unique metric value hash1 obtained by verification and measurement of the fusion computation background and storage thereof at a deployment stage, reporting an error and quitting;

determining whether the fusion computation background has a self-signed certificate, in response to a determination that the fusion computation background does not have a self-signed certificate, generating a self-signed certificate comprising a root certificate CA1, a back-end server certificate, and a back-end server private key using a self-signed certificate generating tool of the fusion computation background, and encrypting and saving the back-end server private key using the key key1;

in response to a determination that the fusion computation background has a self-signed certificate, decrypting and loading an encrypted and saved back-end server private key based on the key key1, in response to the decrypting being successful, continuing to run the program, and in response to the decrypting being unsuccessful, determining that the loading an encrypted and saved back-end server private key fails;

enabling, by the fusion computation background, an Https interface service based on the self-signed certificate for a front-end web service to invoke;

receiving, by the fusion computation background, in the TEE, database configuration information, and encrypting and saving the database configuration information by the key key1 of the TEE; and performing a decrypting process, comprising: when a start running interface is invoked, decrypting, by the fusion computation background, in the TEE, the corresponding database configuration information and loading the database configuration information into the encrypted memory, establishing a secure link with all parties' databases based on the database configuration information, pulling corresponding data into the encrypted memory for fusion computation according to a data fusion computation logic of the fusion computation background, and returning a result to one or more parties requesting a fusion result after completion of the fusion computation.

2. The method for zero-trust fusion computation of multi-party data according to claim 1, wherein the fusion computation background is embedded with the self-signed certificate generating tool at a development stage;

at a deployment stage of the fusion computation background, the fusion computation background is measured by a program integrity verifying tool to obtain the unique metric value hash1; and in the verifying, the loaded fusion computation background is measured by a same program integrity verifying tool in the TEE to obtain the unique metric value hash1.

3. The method for zero-trust fusion computation of multi-party data according to claim 2, further comprising at a deployment stage of a software of the fusion computation background, before startup of the fusion computation background, measuring the fusion computation background by the program integrity verifying tool to obtain the unique metric value hash1 and save the metric value hash1;

when the fusion computation background is started up for the first time, measuring, by using the same program integrity verifying tool, in the TEE, the loaded fusion computation background to obtain the unique metric value hash1, and comparing the unique metric value hash1 with the saved hash1, in response to the unique metric value hash1 and the saved hash1 being consistent, starting to run the program, and deriving the unique corresponding key key1 for the unique metric value hash1 based on the unique metric value hash1; and in the verifying, when verified in TEE that the unique metric value hash1 of the fusion computation background is consistent with the unique metric value hash1 thereof saved at the deployment stage, starting the program, and obtaining the correct key key 1.

4. The method for zero-trust fusion computation of multi-party data according to claim 2, wherein the root certificate CA1 of the fusion computation background is in a program of a front-end web service; and in the enabling, the self-signed certificate of the fusion computation background is verified by using the root certificate CA1, in response to verification being successful, an Http connection between the front-end web service program and the fusion computation background is established, in response to the verification failing, connection fails.

5. The method for zero-trust fusion computation of multi-party data according to claim 4, wherein the front-end web service is embedded with the self-signed certificate generating tool at the development stage, the method further comprising before the decrypting process:

performing a loading process, comprising: starting up the front-end web service, in the TEE, loading the front-end web service into the encrypted memory, verifying, in the TEE, a unique metric value hash2 of the front-end web service, and if in response to the unique metric value hash2 being consistent with a unique metric value hash2 obtained by measuring the front-end web service and saved at the deployment stage, starting running and acquiring a key key2 derived by the TEE and uniquely bound to the front-end web service, in response to the unique metric value hash2 being inconsistent with a unique metric value hash2 obtained by measuring the front-end web service and saved at the deployment stage, reporting an error and quitting;

after the front-end web service starts up, determining whether the front-end web service has a self-signed certificate, in response to a determination that the front-end web service does not have a self-signed certificate, generating a self-signed certificate comprising a root certificate CA2, a front-end server certificate and a front-end server private key using the self-signed certificate generating tool of the front-end web service, and encrypting and saving the front-end server private key using the key_key2; and in response to a determination that the front-end web service has a self-signed certificate, decrypting and loading an encrypted and saved front-end server private key based on the key key2, in response to the decrypting an encrypted and saved front-end server private key being successful, continuing to run the program, in response to the decrypting an encrypted and saved front-end server private key being unsuccessful, determining that the loading an encrypted and saved front-end server private key fails.

6. The method for zero-trust fusion computation of multi-party data according to claim 5, further comprising at a deployment stage of a software of the program of the front-end web service, before startup of the front-end web service, measuring the front-end web service and the root certificate CA1 by the program integrity verifying tool to generate the unique metric value hash2 for identifying the program of the front-end web service, and saving the unique metric value hash2:

When the front-end web service starts for the first time, measuring the loaded front-end web service, by using the same integrity verifying tool, in the TEE, to obtain the unique metric value hash2, and comparing the unique metric value hash2 with the saved hash2, in response to the unique metric value hash2 and the saved hash2 being consistent, starting to run the program, and deriving the unique corresponding key key2 for the unique metric value hash2 based on the unique metric value hash2; and wherein during the loading process, when the TEE verifies that the unique metric value hash2 of the front-end web service is consistent with the unique metric value hash2 thereof saved at the deployment stage, the program starts to run, and the correct key key2 is obtained.

7. The method for zero-trust fusion computation of multi-party data according to claim 6, wherein a browser used by a user is installed with the root certificate CA2, when each party of data accesses the front-end web service through the browser, a transport layer security (TLS) certificate of an access link is verified by using the root certificate CA2, and feedback is provided according to a verification result.

\* \* \* \* \*